United States Patent [19]

Imazeki et al.

[11] Patent Number: 5,065,306
[45] Date of Patent: Nov. 12, 1991

[54] SERIAL INTERCHANGE MACHINE INTERFACE CIRCUIT

[75] Inventors: Ryoji Imazeki, Hachioji; Mitsuo Kurakake, Hino, both of Japan

[73] Assignee: Fanuc, Ltd., Minamitsuru, Japan

[21] Appl. No.: 306,453

[22] PCT Filed: May 24, 1988

[86] PCT No.: PCT/JP88/00494
§ 371 Date: Jan. 27, 1989
§ 102(e) Date: Jan. 27, 1989

[87] PCT Pub. No.: WO88/09531
PCT Pub. Date: Dec. 1, 1988

[30] Foreign Application Priority Data

May 28, 1987 [JP] Japan .................. 62-132806

[51] Int. Cl.$^5$ .................................... G05B 19/18
[52] U.S. Cl. .................. 364/138; 364/DIG.2; 364/921; 364/939.5; 364/926.93; 395/500
[58] Field of Search ... 364/200 MS File, 900 MS File, 364/138

[56] References Cited

U.S. PATENT DOCUMENTS

| | | | |
|---|---|---|---|
| 4,047,003 | 9/1977 | LaRocca et al. | 364/138 |
| 4,071,911 | 1/1978 | Mazur | 364/900 |
| 4,200,936 | 4/1980 | Borzcik et al. | 364/900 |
| 4,368,511 | 1/1983 | Imazeki | 364/167 |
| 4,628,442 | 12/1986 | Isobe et al. | 364/200 |
| 4,628,446 | 12/1986 | Hoffner | 364/200 |

FOREIGN PATENT DOCUMENTS 0067228 11/1981 European Pat. Off. .
2038035 12/1979 United Kingdom .

OTHER PUBLICATIONS

"Patent Abstracts of Japan", vol. 9, No. 207, *Numerical Controller*, Aug. 24, 1985.

*Primary Examiner*—Michael R. Fleming
*Assistant Examiner*—Gopal C. Ray
*Attorney, Agent, or Firm*—Staas & Halsey

[57] ABSTRACT

A machine interface circuit for controlling terminal units such as relays, switches and the like of a machine tool through a numerical control unit is disclosed. The machine interface circuit comprises an interchange circuit (11) connected to the numerical control unit (1) through a serial interface; and module circuits (20, 40) connected to the interchange circuit (11) through serial interfaces, each module including a serial/parallel conversion circuit (30, 50) and drivers (21a) and/or receivers (41a). According to the present invention, the machine interface circuit transmits parallel signals over a short distance and includes cables and cable bundles having a simple construction.

2 Claims, 3 Drawing Sheets

SERIAL INTERCHANGE MACHINE INTERFACE CIRCUIT

TECHNICAL FIELD

The present invention relates to a machine interface circuit for controlling terminal units such as relays, switches and the like of a machine tool, and more specifically, to an improved machine interface circuit connected to the relays, switches and the like in a simple manner.

BACKGROUND ART

A numerical control unit is usually interfaced with a machine tool through a serial interface in accordance with an increased number of signals.

An example of this is shown in FIG. 3, wherein 1 designates the numerical control unit, and 70 designates an I/O base unit. Usually a plurality of I/O base units are used for a single numerical control unit 1. Two I/O base units 70, 80 are shown in the drawing, and since the I/O base unit 70 and the I/O base unit 80 have substantially the same arrangement, only the I/O base unit 70 will be described. The I/O base unit 70 is connected to the numerical control unit 1 through a serial interface drive unit such as relays and the like by a driver 72a. A serial signal from computer numerical controller (CNC) 1 is converted into a parallel signal by a serial/parallel converter 71. A signal from switches of the machine tool is received by a receiver 73a and the like, converted into a serial signal by the serial/parallel converter 71, and applied to the numerical control unit 1.

The I/O base unit 70 and the like are disadvantageous, in that they include a considerable number of I/O units, long parallel leads must be used to connect the I/O base unit 70 to the relays, the switches and the like of the machine tool and further, problems arise in the manufacture and cost thereof. Although the base unit 70 may be installed in the vicinity of the relays and the like, this causes another problem in that the parallel signal cables to the other switches and the like must be made longer.

SUMMARY OF THE INVENTION

An object of the present invention is to solve the above problems and to provide an improved machine interface circuit which can be connected to relays, switches and the like in a simple manner.

To achieve the above object, in accordance with the present invention, there is provided, as shown in FIG. 1, a machine interface circuit for controlling terminal units such as relays, switches and the like of a machine tool through a numerical control unit (1): comprising interchange circuits (11, 12) connected to the numerical control unit (1) through a serial interface; and
 module circuits (20, 60) connected to the interchange circuits (11, 12) through serial interfaces, each module including a serial/parallel conversion circuit (30, 50) and drivers (21a) and/or receivers (41a).

Since a serial signal from the numerical control unit is once interchanged by interchange circuits and then transmitted to the vicinity of a group of the relays of the machine tool as the serial signal and there converted into a parallel signal, the distance over which the parallel signal is transmitted shortened, and thus cables, cable bundles, and the like can be provided easily. A signal from the group of the switches is processed in the same manner, but in a reverse direction.

DESCRIPTION OF THE PREFERRED EMBODIMENT

An embodiment of the present invention will be hereinafter described in detail with reference to the drawings.

Figure 1:
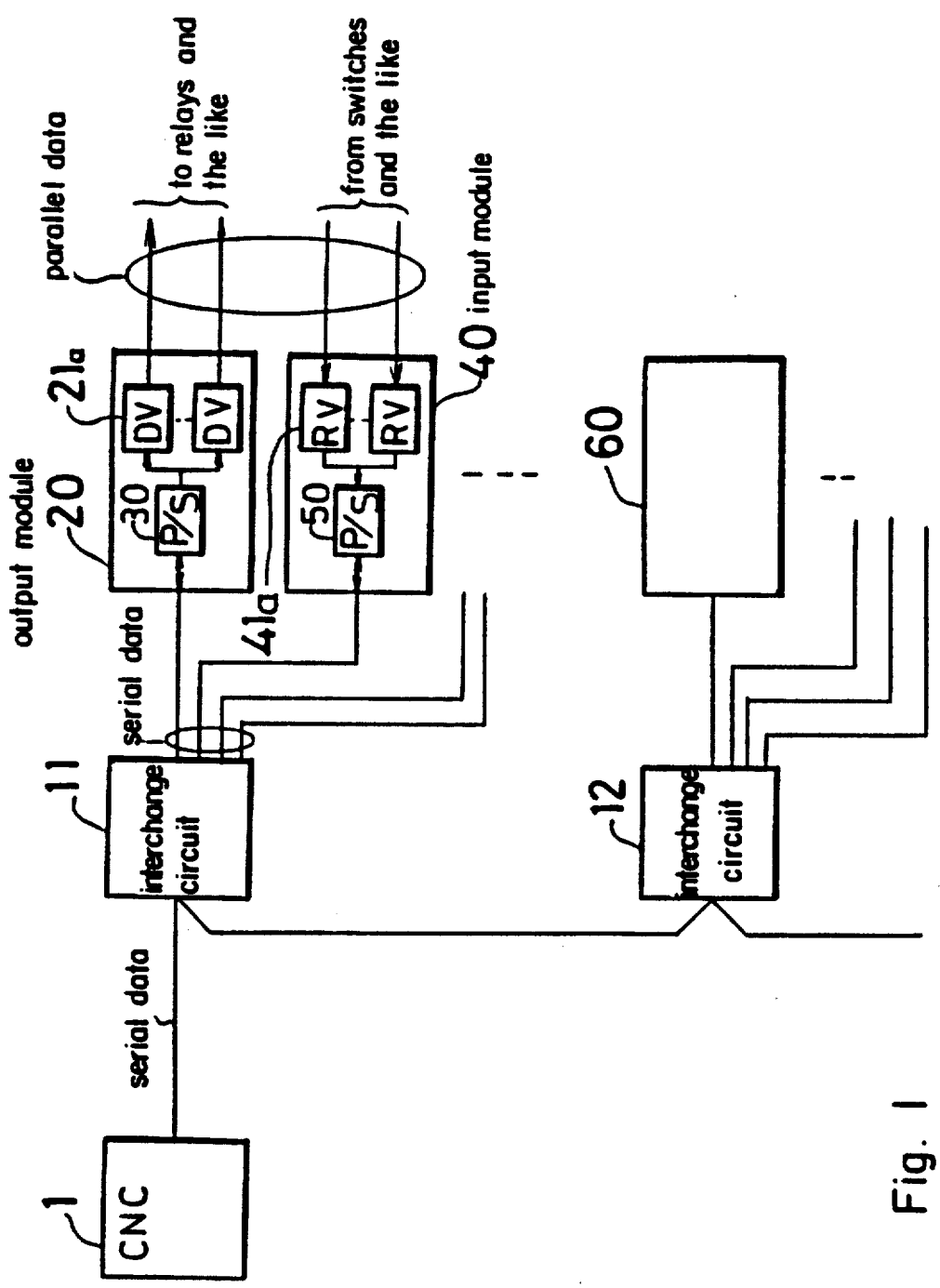
FIG. 1 is a block diagram of an embodiment of the present invention.

FIG. 1 is a block diagram of the embodiment of the present invention, wherein 1 designates a numerical control unit, and 11 and 12 designate interchange circuits, the numerical control unit 1 being connected to the interchange circuits through a serial interface. The number of interchange circuits 11 and the like is determined in accordance with the overall scale of an NC machine tool.

The interchange circuit 11 is connected to an output module 20 and an input module 40 and the like through serial interfaces. The output module 20 and the input module 40 are installed in the vicinity of a group of relays and a group of switches of the machine tool, respectively; for example, they are installed on a relay panel or inside a machine operation panel, and thus the leads for the parallel signal can be made as short as possible. The signal from the numerical control unit 1 is transmitted to the relays and the like through the interchange circuit 11 and the output module, and the signal from the switches and the like is transmitted to the numerical control unit 1 through the input module 40 and the interchange circuit 11. The serial signals are preferably transmitted through optical fibers.

The output module 20 comprises a serial/parallel conversion circuit 30 and drivers 21a, and the like. The number of drivers 21a and the like depends on the system applied to the machine tool, and in practice, is usually 10 to 50 sets. The serial/parallel conversion circuit 30 will be described in detail later.

The input module 40 has substantially the same arrangement as the output module 20 and comprises a serial/parallel conversion circuit 50 and receivers 41a and the like. The number of receivers 41a corresponds to the number of drivers 21a and the like of the output module 20; in practice, the module includes 10 to 50 sets of the receivers.

Figure 2:
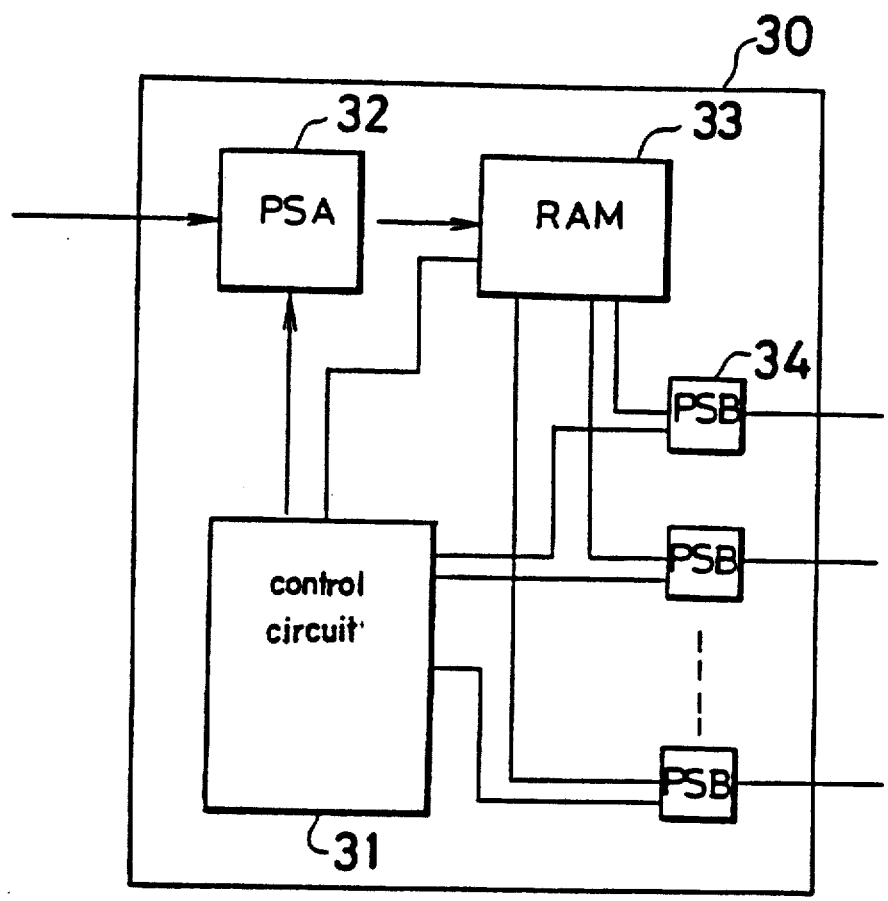
FIG. 2 is a detailed diagram of a serial/parallel conversion circuit.
Figure 3:
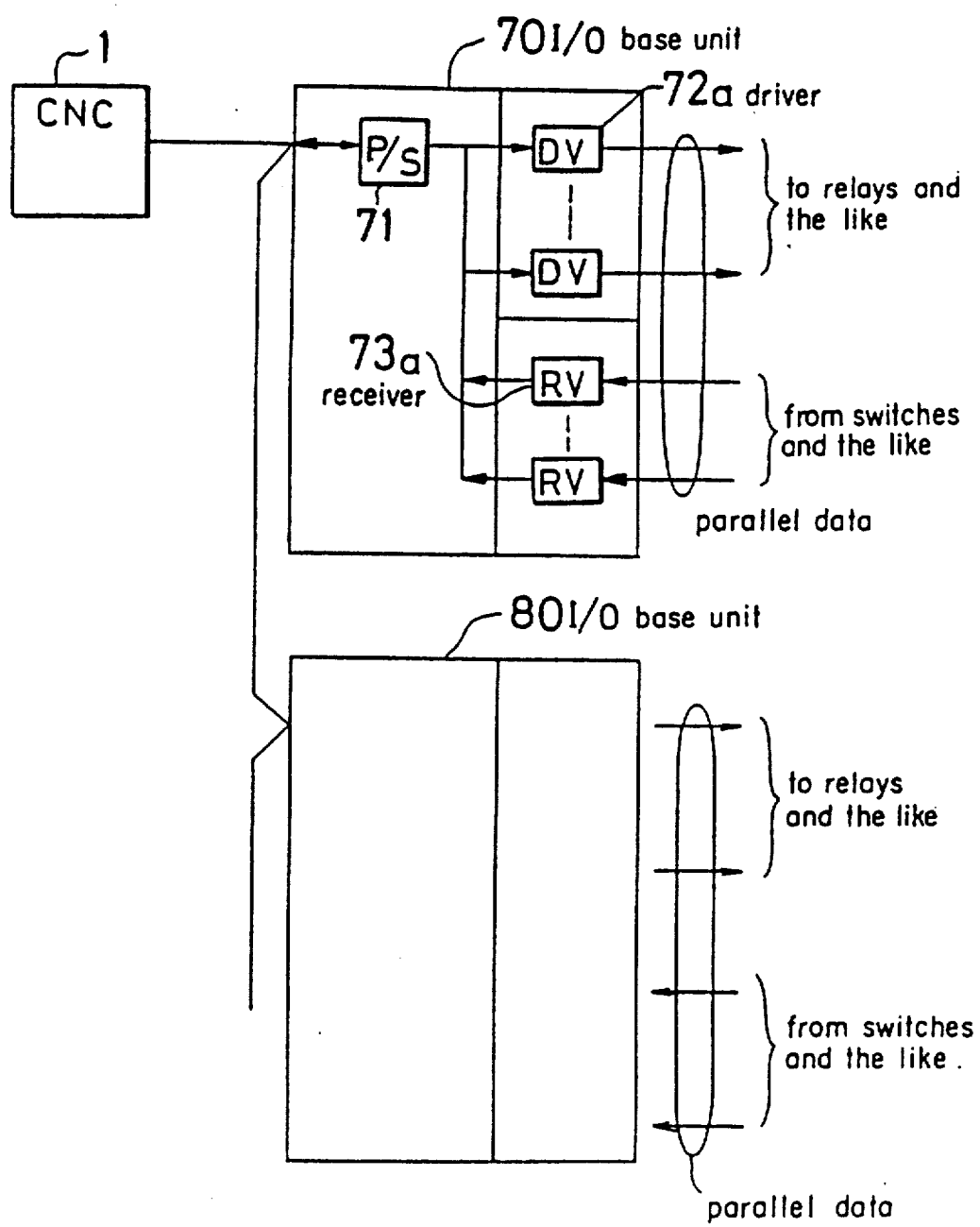
FIG. 3 is a diagram of a conventional interface between a numerical control unit and a machine tool.

Next, the serial/parallel conversion circuit 30 used by the output module 20 and the serial/parallel conversion circuit 50 used by the input module will be described. Since the two circuits are substantially the same, only the serial/parallel conversion circuit 30 used by the output module 20 will be described in detail. FIG. 2 shows the arrangement of the serial/parallel conversion circuit 30, wherein 31 designates a control circuit effecting an overall control of the conversion circuit 30; and 32 designates a conversion circuit effecting a serial to parallel conversion of input signals and applying the converted signals to a RAM 33. The RAM stores the signals as bit signals. The signals are written into respective output bit circuits 34 and output therefrom as parallel signals. Such circuits can be easily produced by appropriate IC's or the like. The serial/parallel conversion circuit 50 has substantially the same arrangement as the serial/parallel conversion circuit 30 except that signals flows therethrough in the reverse direction.

In the above embodiment, although the modules are separated into modules for inputs and modules for outputs, the inputs and the outputs may be mixed and provided in the same module. For example, 10 sets of drivers may be combined with 20 sets of receivers.

The above arrangement can reduce the number of parallel leads at the machine side.

According to the present invention, as described above, since the serial signals from the numerical control unit are interchanged once by the interchange circuits, transmitted to the vicinity of the group of the switches and the relays of the machine tool and there converted into parallel signals, the parallel signals are transmitted over a only short distance, and thus cables and cable bundles can be easily manufactured and the cost thereof is reduced.

We claim:

1. A machine interface circuit for exchanging information with controlling terminal units of a machine tool through a numerical control unit having a serial interface for receiving and sending serial data representing the information, comprising:

interchange means operatively connected to the numerical control unit through the serial interface, for receiving the serial data from the numerical control unit and for providing a plurality of serial signals based on the serial data; and a plurality of module circuit means, respectively connected to receive a corresponding one of said serial signals provided by said interchange means and including at least one of a driver and a receiver operatively connected to said interchange means and the terminal units, for performing a serial/parallel conversion to convert the corresponding serial signal to a parallel signal for the terminal units.

2. A machine interface circuit according to claim 1, wherein said serial interface comprises optical fibers.

* * * * *